(12) United States Patent
Ranganathan (10) Patent No.: US 7,822,966 B2
(45) Date of Patent: Oct. 26, 2010

(54) EXTENDED TRUSTED COMPUTING BASE

(75) Inventor: Kumar Ranganathan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 259 days.

(21) Appl. No.: 11/985,714

(22) Filed: Nov. 15, 2007

(65) Prior Publication Data

US 2008/0141024 A1    Jun. 12, 2008

Related U.S. Application Data

(63) Continuation of application No. 10/688,499, filed on Oct. 17, 2003, now Pat. No. 7,313,679.

(51) Int. Cl.
*G06F 15/177* (2006.01)
(52) U.S. Cl. .................. 713/2; 713/100; 713/192; 713/194; 726/34
(58) Field of Classification Search .............. 326/8; 713/1, 2, 100, 192, 194; 726/34
See application file for complete search history.

(56) References Cited

U.S. PATENT DOCUMENTS

| 6,185,678 | B1 | 2/2001 | Arbaugh et al. |
| 6,978,018 | B2 | 12/2005 | Zimmer |
| 7,103,914 | B2 | 9/2006 | Focke et al. |
| 7,127,579 | B2 | 10/2006 | Zimmer et al. |
| 7,313,679 | B2 * | 12/2007 | Ranganathan .................. 713/1 |

OTHER PUBLICATIONS

Arbaugh, William A., et al., "A Secure and Reliable Bootstrap Architecture", *University of Pennsylvania*, 65-71.
England, Paul, et al., ""A Trusted Open Platform"", *Computer*, (Jul. 2003), pp. 55-62.

* cited by examiner

*Primary Examiner*—Michael Pyzocha
*Assistant Examiner*—Paul Callahan
(74) *Attorney, Agent, or Firm*—Blakely, Sokoloff, Taylor & Zafman LLP (57) ABSTRACT

A method, apparatus, and system are provided for extending a trusted computing base (TCB). According to one embodiment, a first level trusted computing base (TCB) is generated having hardware components including a trusted platform module (TPM), and an extended TCB is formed by adding a second level software-based TCB to the first level TCB, and properties associated with the first level TCB are transferred to the second level TCB.

14 Claims, 6 Drawing Sheets

EXTENDED TRUSTED COMPUTING BASE

RELATED APPLICATION

This application is a Continuation Application of U.S. application Ser. No. 10/688,499, entitled EXTENDED TRUSTED COMPUTING BASE, filed on Oct. 17, 2003, now U.S. Pat. No. 7,313,679, and priority is claimed thereof.

BACKGROUND OF THE INVENTION

1. Field of the Invention

This invention generally relates to secure communications and in particular, to enhancing security policy relating to a trusted computing base of a computer system.

2. Description of Related Art

In many modern computing systems and networks, the reliability and security of information flow is of significant importance. To enforce the security policy of a computer system (system), a conventional hardware mechanism, such as a hardware-based Trusted Computing Base (TCB), is typically used. Such a hardware-based TCB is expected to enforce the system's access control policy and provide resistance to unauthorized changes to the system by utilizing various protection mechanisms.

However, conventional hardware protection mechanisms do not provide adequate defense against deliberate attacks on the system, because defense against such attacks have to be based upon the presumption of hostility operators or programs on the system. In particular, these conventional hardware mechanisms are not sufficient to build a TCB that enforces mandatory access control policies in environments where the device cannot be physically secured and is vulnerable to attack by hostile operators.

The operating system in conventional open platforms, such as personal computers (PCs), contain many changing components, such as device drivers and patches, making it difficult to maintain the system in a continually trustworthy state. In high-security environments the TCB must protect sensitive information from operators of the system. Such systems commonly use a closed platform, such as a set-top box, as opposed to an open platform, such as a PC, to reduce not only the number of components, but also to provide better security control over platform hardware and software. However, in comparison to PCs, closed systems are less flexible (fixed function) and often impose an additional cost to consumers. Furthermore, the security of closed function devices cannot be implemented into the open PC platforms, further leaving the consumers without the economic benefit and delivery of richer applications and services.

Conventional hardware-based TCBs are typically limited in speed and slow at secure processing, limited in storage capacity, support a very low level programming interface, have their resources shared by all the software running on the system including two or more virtual machines, provide difficulty with regard to migration of data used by a virtual machine from one system to another system, and have readily unsuitable measurement facility for measuring application programs that are repeatedly terminated.

BRIEF DESCRIPTION OF THE DRAWINGS

The appended claims set forth the features of the present invention with particularity. The embodiments of the present invention, together with its advantages, may be best understood from the following detailed description taken in conjunction with the accompanying drawings of which:

DETAILED DESCRIPTION

A method and apparatus are described for extending a Trusted Computing Base (TCB) of a computer system or device (system). According to one embodiment, a hardware TCB of a system having trustworthy hardware components, including a Trusted Platform Module (TPM), may be extended into one or more layers of software TCB. The hardware TCB may be extended by adding one or more layers of software TCB to it. According to one embodiment, the properties associated with the hardware TCB may be transferred to the one or more layers of software TCB. The properties of the hardware TCB may include its trust and security properties. According to one embodiment, by having the trust and security properties of the hardware TCB projected onto the one or more layers of software TCB, the hardware TCB may be extended to overcome its hardware-related limitations.

According to one embodiment, the hardware TCB may be extended vertically and/or horizontally to create a more flexible, secure, trustworthy, and feature-rich system TCB. To vertically extend the hardware TCB, according to one embodiment, multiple layers of software TCB having the trust and security properties of the hardware TCB may be built on the hardware TCB. To horizontally extend the hardware TCB, according to one embodiment, one layer of software TCB may be built on the hardware TCB and multiple virtual containers and virtual TPMs may be built on the software TCB. As with the vertically extended TCB, the layer of software TCB and the multiple virtual containers and virtual TPMs of the horizontally extended TCB may also have the trust and security properties of the hardware TCB. To ensure trustworthiness of the software TCB, the hardware TCB may remain the root of trust for the entire, vertically or horizontally, extending the TCB by having the trust and security properties of the hardware TCB transferred to the software TCB.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskettes, optical disks, CD-ROMs, magneto-optical disks, ROMs, RAMs, EPROMs, EEPROMs, magnetic or optical cards, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

Figure 1:
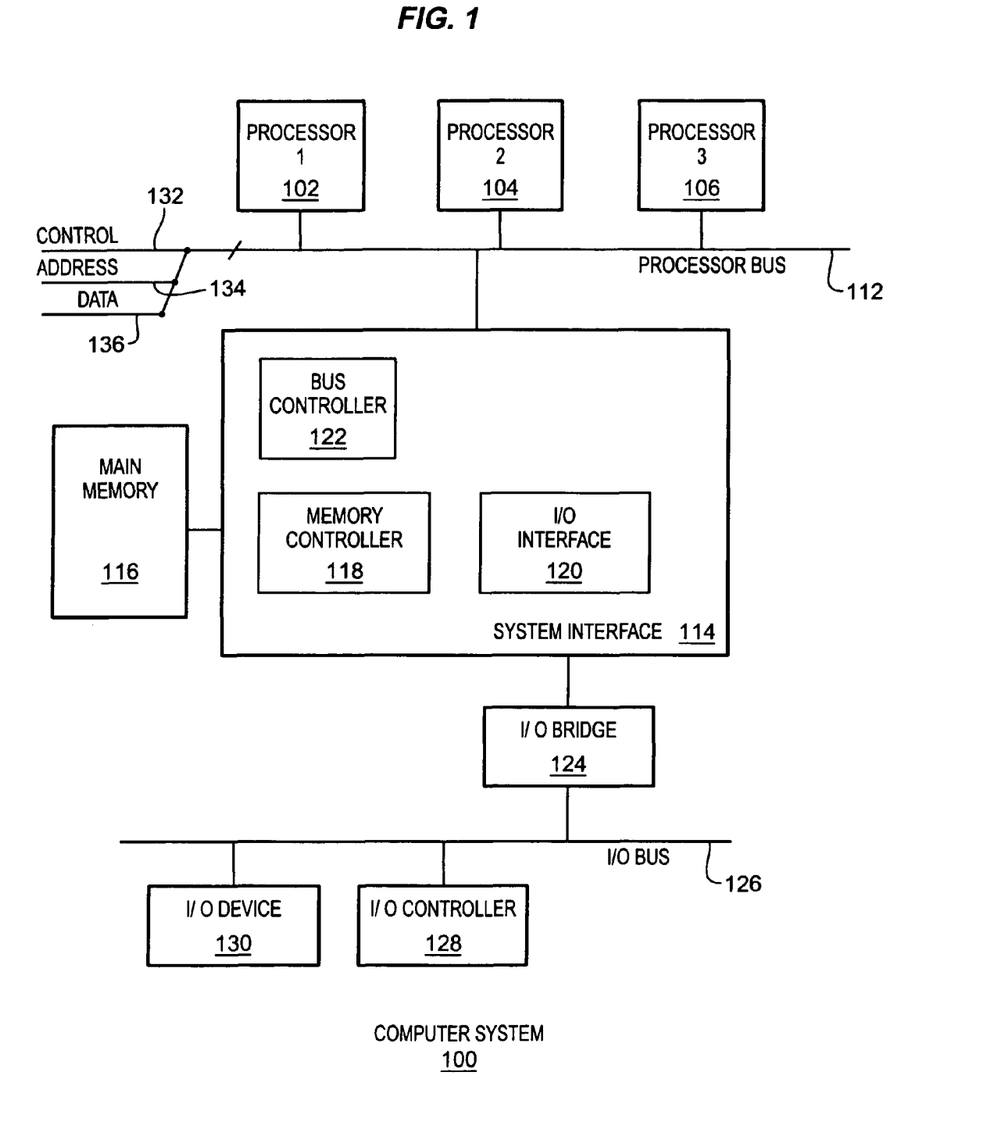
FIG. 1 is a flow diagram illustrating an embodiment of a computer system.

FIG. 1 is a block diagram illustrating an embodiment of a computer system. The computer system (system) includes one or more processors 102-106, including hyperthreaded or multi-threaded processors. A typical multi-threaded processor may include multiple threads or logical processors, and may be capable of processing multiple instruction sequences concurrently using its multiple threads. Processors 102-106 may also include one or more internal caches (not shown) and a bus controller 122 to direct interaction with the processor bus 112.

Processor bus 112, also known as the host bus or the front side bus, may be used to couple the processors 102-106 with the system interface 114. Processor bus 112 may include a control bus 132, an address bus 134, and a data bus 136. The control bus 132, the address bus 134, and the data bus 136 may be multidrop bi-directional buses, e.g., connected to three or more bus agents, as opposed to a point-to-point bus, which may be connected only between two bus agents.

System interface 114 (or chipset) may be connected to the processor bus 115 to interface other components of the system 100 with the processor bus 112. For example, system interface 114 may includes a memory controller 118 for interfacing a main memory 116 with the processor bus 112. The main memory 116 typically includes one or more memory cards and a control circuit (not shown). System interface 114 may also include an input/output (I/O) controller 120 to interface one or more I/O bridges or I/O devices with the processor bus 112. For example, as illustrated, the I/O controller 120 may interface an I/O bridge 124 with the processor bus 112. I/O bridge 124 may operate as a bus bridge to interface between the system interface 114 and an I/O bus 126. One or more I/O controllers and/or I/O devices may be connected with the I/O bus 126, such as I/O controller 128 and I/O device 130, as illustrated. I/O bus 126 may include a Peripheral Component Interconnect (PCI) bus or other type of I/O bus.

System 100 may include a dynamic storage device, referred to as main memory 116, or a random access memory (RAM) or other coupled to the processor bus 112 for storing information and instructions to be executed by the processors 102-106. Main memory 116 also may be used for storing temporary variables or other intermediate information during execution of instructions by the processors 102-106. System 100 may include a read only memory (ROM) and/or other static storage device coupled to the processor bus 112 for storing static information and instructions for processor 110.

Main memory 116 or dynamic storage device may include magnetic disk or optical disc for storing information and instructions. I/O device 130 may include a display device (not shown), such as a cathode ray tube (CRT) or Liquid Crystal Display (LCD), for displaying information to an end user. For example, graphical and/or textual indications of installation status, time remaining in the trial period, and other information may be presented to the prospective purchaser on the display device. I/O device 130 may also include an input device (not shown), such as an alphanumeric input device, including alphanumeric and other keys for communicating information and/or command selections to processor 110. Another type of user input device includes cursor control, such as a mouse, a trackball, or cursor direction keys for communicating direction information and command selections to the processors 102-106 and for controlling cursor movement on the display device.

System 100 may also include a communication device (not shown), such as a modem, a network interface card, or other well-known interface devices, such as those used for coupling to Ethernet, token ring, or other types of physical attachment for purposes of providing a communication link to support a local or wide area network, for example. Stated differently, the system 100 may be coupled with a number of clients and/or servers via a conventional network infrastructure, such as a company's Intranet and/or the Internet, for example.

It is appreciated that a lesser or more equipped computer system than the example described above may be desirable for certain implementations. Therefore, the configuration of computer system 100 will vary from implementation to implementation depending upon numerous factors, such as price constraints, performance requirements, technological improvements, and/or other circumstances.

It should be noted that, while the embodiments described herein may be performed under the control of a programmed processor, such as processors 102-106, in alternative embodiments, the embodiments may be fully or partially implemented by any programmable or hardcoded logic, such as Field Programmable Gate Arrays (FPGAs), TTL logic, or Application Specific Integrated Circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

Figure 2:
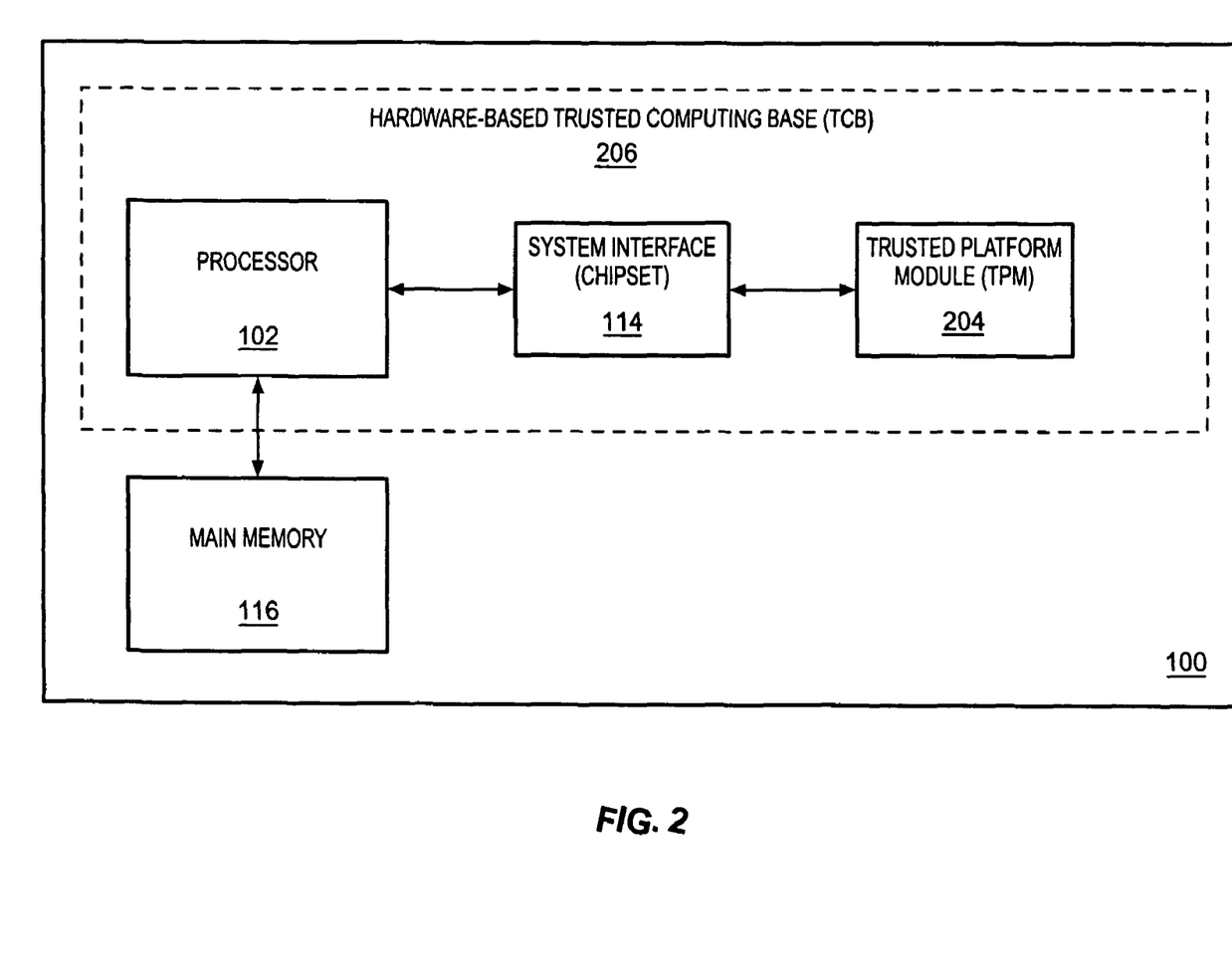
FIG. 2 is a block diagram illustrating an embodiment of a Trusted Computing Base.

FIG. 2 is a block diagram illustrating an embodiment of a hardware Trusted Computing Base. As illustrated, computer system or device (system) 100 may include a hardware Trusted Computing Base (TCB) 206 based on a hardware device, such as a Trusted Platform Module (TPM) 204, a processor 102 having security extensions to provide a tamper-resistant facility for software measurement and address space isolation, and a system interface or chipset, such as the security-enhanced chipset, 114 to provide special security capabilities including the ability to selectively protect main memory 116 from, for example, Direct Memory Access (DMA)-based input/output (I/O). The system 100 may be referred to as the TCB-based system 100.

According to one embodiment, the TCB 206 may be manufactured by a system or device manufacturer so that the TCB 206 may be equipped to perform, for example, functions necessary for supporting various protocols and delivering the baseline hardware security capabilities, as described herein. According to one embodiment, the TCB-based system 100 may include various specialized security mechanisms including one or more of the following: the ability to measure software in a tamper-resistant manner, a secure storage for confidential information, a unique machine identity, and the ability to securely report the measured integrity of software on the system 100 (e.g., by a process known as attestation) to a remote system.

According to one embodiment, the processor 102 may be used to measure the booted software in a tamper-resistant manner, and the TPM 204 may be utilized as a secure co-processor to provide tamper-resistant secure storage for confidential information, tamper-resistant storage for measured values, and tamper-resistant cryptographic algorithms to support attestation protocols. For example, the tamper-resistant processor 102 may be used to measure software that may be loaded on the system 100. According to one embodiment, the measured value may be cryptographic hash of the software image and may represent the integrity of the measured software. According to one embodiment, the measured value may be subsequently signed by a tamper-resistant co-processor (e.g., the TPM 204) using a key that may be contained and hidden in the TCB 206 and more particularly, for example, in the TPM 204. According to one embodiment, the process of attestation may be used for having the signed value reported to a remote system via, for example, a cryptographic protocol. The remote system may ascertain the trustworthiness of the measured software and may make a trust decision based on the trustworthiness of information reported by the hardware TCB 206 of the measured system 100.

According to one embodiment, the TPM 204 may hold previously measured information about the software and hardware environment of the system 100. Each of the TPMs, such as the TPM 204, may have a unique endorsement key (EK) to be used to establish an identity for the system 100. The TPM 204 may have a cryptographic execution engine to support an attestation protocol using the measured values and the system identity. Furthermore, the TPM 204 may have a secure storage facility in which applications may store keys and other secrets. These secrets may be released to the applications if, for example, they present the right credentials. The TPM 204 may not raise the assurance level of the system 100 as a whole on its own, because it may not directly measure software; however, that task may be performed by the processor 102 and the result may be stored in the TPM 204. According to one embodiment, the trustworthiness of the system 100 may be anchored in the hardware TCB 206.

According to one embodiment, the hardware TCB 206 may be extended vertically and/or horizontally with layers of software to create a more flexible and feature-rich system TCB. According to one embodiment, to ensure the trustworthiness of the layers of software TCB, the hardware TCB 206 may remain the root of trust of the overall system TCB. Stated differently, the trust and security properties of the hardware TCB 206 may be transmitted onto the software TCB to maintain the trustworthiness of the entire TCB including both the hardware TCB 206 and the software TCB.

Figure 3:
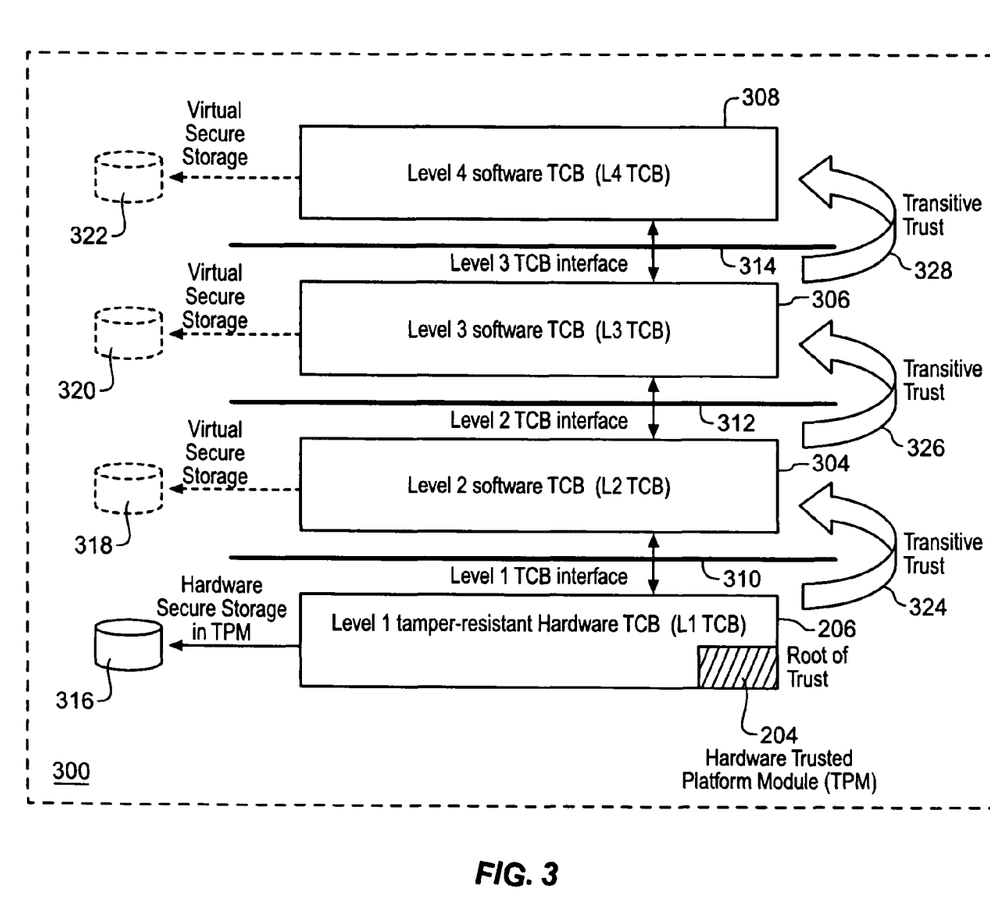
FIG. 3 is a block diagram illustrating an embodiment of a vertically extended Trusted Computing Base.

FIG. 3 is a block diagram illustrating an embodiment of a vertically extended Trusted Computing Base. According to one embodiment, the Level one hardware Trusted Computing Base (L1 TCB) 206 may be used as a tamper-resistant trustworthy measurement and attestation agent to establish the identity and integrity of platform software (e.g., via a checksum or hash) in order to, for example, enable a remote entity, such as a computer system (system), to assess its trustworthiness. Such capability may be important in environments that depend on system software monitors that enforce mandatory access controls (MAC).

According to one embodiment, the hardware L1 TCB 206 may be used to build an extended TCB 300 by adding one or more layers of software. For example, according to one embodiment, a layer of software, such as Level two software TCB (L2 TCB) 304, may be added to or built upon the L1 TCB 206. The L2 TCB 304 may include a trusted kernel, while the L1 TCB 206 may include various hardware components, such as a Trusted Platform Module (TPM) 204, as discussed with reference to FIG. 2. According to one embodiment, the trust and security properties of the L1 TCB 206 may be transferred or projected onto the L2 TCB 304 via, for example, a Level one TCB interface (L1 TCB interface) 310. According to one embodiment, the L1 TCB interface 310 may expose certain security services and properties that may be used to create an appropriate execution environment for the L2 TCB 304. According to one embodiment, these services and properties may include one or more of the following: hardware-based software measurement facility, hardware-based tamper-resistant secure storage, Direct Memory Access (DMA) protection from input/output (I/O) devices, address-space isolation, and attestation of measurements to remote machines or systems via a root key contained in the hardware.

According to one embodiment, the L1 TCB interface 310 may include a low-level hardware TCB interface with certain inherent, necessary, or desired limitations. According to one embodiment, the L2 TCB 304 may be constructed using the low-level L1 TCB interface 310. For example, by utilizing the L1 TCB services via the L1 TCB interface 310, the L2 TCB 304 may have a secured software kernel, and the L2 TCB 304 may be used to implement one or more of the following: a tamper-resistant measurement facility in software, a software-based tamper-resistant secured storage facility, and a software-based attestation facility. As opposed to code in the L1 hardware TCB, much of which may be executed using a slow co-processor (e.g. the TPM) having a relatively small storage capacity, the code in the L2 TCB 304 may be executed on the main processor, such as the processor 102, while utilizing the main memory 116 for its operations.

According to one embodiment, the L2 TCB 304 having a secure kernel may measure other software, such as device drivers and loadable modules, running on the system 100, and may store these measurements within its own protected area (e.g., in the Random Access Memory). Furthermore, according to one embodiment, a private key stored in the L2 TCB 304 may also perform attestations of software that the L2 TCB 304 may be used to measure.

According to one embodiment, the trustworthiness of the L2 TCB 304 may depend on the trust of the underlying L1 TCB 206 by, for example, having the trust and security properties of the L1 TCB 206 inductively transitively projected from the hardware-based L1 TCB 206 to the software-based L2 TCB 304. For example, attestations made by the L2 TCB 304 may include an attestation of the L2 TCB 304 made by the L1 TCB 206 by having the L1 TCB 206 sign one or more public keys of the L2 TCB 304 that may correspond to the private keys used by the L2 TCB 304 for attestation. According to one embodiment, this attestation chain may not be limited to one software-based TCB, such as the L2 TCB 304, but may also continue with additional software-based TCB layers. Having the attestations rooted in and measured by the hardware-based L1 TCB 206 may help provide and maintain a high security assurance and trustworthiness for software including various software-based TCB layers, such as the L2 TCB 304.

According to one embodiment, to further vertically extend the hardware-based L1 TCB 206, additional layers of software, such as Level three software TCB (L3 TCB) 306, may be added to or built upon, for example, the L2 TCB 304. Similarly, another layer of software, such as Level four software TCB (L4 TCB) 308 may be added to or built upon, for example, the L3 TCB 306. According to one embodiment, the L3 TCB 306 may include trusted services (e.g., network services, file system services, and provisioning services) and the L4 TCB 308 may include trusted applications (e.g., login, biometric pattern matching, and signal processing). As with the L2 TCB 304, the trust and security properties of the L1 TCB 206 may be inductively transferred onto the multiple software layers of TCB (e.g., L3 TCB 306 and L4 TCB 308) via multiple TCB interfaces, such as Level two TCB interface (L2 TCB interface) 312 and Level three TCB interface (L3 TCB interface) 314, as indicated by the transitive trust arrows 324-328.

According to one embodiment, properties, such as qualities and capabilities, of each of the TCB interfaces at various layers (e.g., L1, L2, and L3 TCB interfaces 310-314) may be tailored to suit the requirements of software at that layer (e.g., L2, L3, and L4 TCB 304-308). For example, at the L2 TCB interface 312, the data types may be richer and the storage size may be much larger than at the L1 TCB interface 310, because the L2 TCB interface 312 exposed by the L2 TCB 304 may be at a much higher and more intuitive level of abstraction and may also expose a significantly different programming model than the L1 TCB interface 310 exposed by the L1 TCB 206.

According to one embodiment, the TCB-like trust and security properties may include a secured storage facility, one or more measurement agents, an attestation facility, and a tamper-resistant execution environment for software created recursively using the software-based L2-L4 TCBs 304-308 and terminating at the hardware-based L1 TCB 206. According to one embodiment, the L1 TCB 206 having the hardware TPM 204 may provide a hardware-based trustworthy foundation for the recursive chain of L2-L4 TCBs 304-308 via a measurement facility rooted in the trustworthy hardware-based L1 TCB 206. According to one embodiment, the software-based TCBs, such as the L2-L4 TCBs 304-308, may rely upon the hardware protection architecture of the L1 TCB 206 in combination with secured operating system (OS) design (e.g., MAC-based security or careful control of all machine resources via memory & I/O isolation) to provide tamper-resistance for themselves.

According to one embodiment, the TCB-like trust and security properties may make circumventing the vertically extended TCB 300 infeasible by, for example, continually mediating, restricting, and grating all accesses, based on an access control policy. Furthermore, according to one embodiment, the TCB 300 may be self-protected and resistant to unauthorized change or access, and yet the TCB 300 may be simple enough to have an open design to be analyzed for correctness, as necessitated.

According to one embodiment, a software-based TCB, such as the L2 TCB 304, may include a trusted reference monitor (monitor) having and exhibiting the trust and security properties of the TCB 300. The monitor may be part of an operating system or a virtual machine monitor to enforce the authorized access relationships between various components of a system, such as the system 100. According to one embodiment, the monitor may establish its trustworthiness by demonstrating the ability to enforce access control policy with regard to volatile and persistent data and thus, performing as an overall guard of the system 100. This trustworthiness may be represented to a remote system via an attestation protocol that demonstrates the integrity of the monitor using the hardware L1 TCB 206 as being the root of trust for the signature in the attestation protocol. Since the monitor may be certified by a trusted authority, it may also provide necessary security assurance, which typically refers to the degree of confidence in the ability of a system to meet its security objectives.

According to one embodiment, the L1 TCB 206 may be provisioned with platform keys that reside in the hardware TPM 204 exposing its services to the L2 TCB 304 via the L1 TCB interface 310. The L1 TCB interface 310 may also correspond to the low-level hardware interfaces exposed by the TPM 204 and other related hardware of the system 100. According to one embodiment, the L1 TCB 206 may contain a hardware-based measurement agent that may be the root of trust for all integrity measurement (e.g. a processor microcode that measures a module code). Thus, the lowest trusted hardware foundation, such as the L1 TCB 206, may be referred to as the root of trust of the entire vertically extended TCB, such as the TCB 300.

According to one embodiment, the L1 TCB 206 may be directly or indirectly coupled with a hardware secure storage facility, such as the hardware secure storage 316. According to one embodiment, the L2 TCB 304 may internally implement a logical or virtual secure storage facility 318 by using encrypted disk files. The encryption keys for the virtual secure storage facility 318 may not leave the L2 TCB 304 except to be encrypted within the L1 TCB 206. According to one embodiment, as with the L1 TCB 206, the L2 TCB 304 may contain a measurement agent and its own equivalent of values that it may use for integrity measurement of the L3 TCB 306. Furthermore, as with the L1 TCB 206, the L2 TCB 304 may be provisioned with the secrets and certificates it needs to perform its function. According to one embodiment, the L2 TCB 304 may expose its services to the L3 TCB 306 via the L2 TCB interface 312. According to one embodiment, like L2 TCB 304, other software TCB layers, such as the L3 TCB 306 and the L3 TCB 308, may also internally implement logical or virtual secure storage facilities, such as the virtual secure storages 320 and 322, using encrypted disk files, and may expose their trust and services to other software TCB layers up to the $N^{th}$ layer of software TCB via transitive trust by induction, as described herein.

According to one embodiment, the TCB 300 may enable a peer-to-peer interaction between two machines or systems of each of the customized software TCB layers, such as the L2-L4 TCBs 304-308, at their own level without each being encumbered by the implementation details of the TCBs below it. According to one embodiment, the remote entity or system validating attestations may need to know about the security assurance of the various TCBs, such as 302-308, in the chain.

According to one embodiment, using the vertically extended TCB 300, the integrity of every software module may be appropriately measured. While the trustworthiness of all software is eventually rooted in a hardware measurement of the base hardware, such as the L1 TCB 206, for the software at other levels, such as the L2-L4 TCB 304-308, the measurement, and its timing and content, may not be limited or dictated by the capabilities of the hardware L1 TCB 206.

Furthermore, according to one embodiment, the vertically extended TCB 300 may be immune from a total TCB compromise or violation. For example, if the TCB 300 at a particular level (e.g., L3 TCB 306) is compromised, all higher-level TCBs (e.g., L4 TCB 308) may also be considered compromised because they depended on their lower-level TCBs which include the compromised TCB (e.g., L3 TCB 306). However, the lower-level TCBs (e.g., L2 TCB 304) below the compromised L3 TCB 306 may not be violated or compromised and still be considered secured. Thus, in case of a TCB compromise, the TCBs at the level of the compromised TCB (e.g., L3 TCB 306) and above (e.g., L4 TCB 308) may need to be re-established, and the TCBs lower than the compromised TCB may remain uncompromised, active, and secured.

Figure 4:
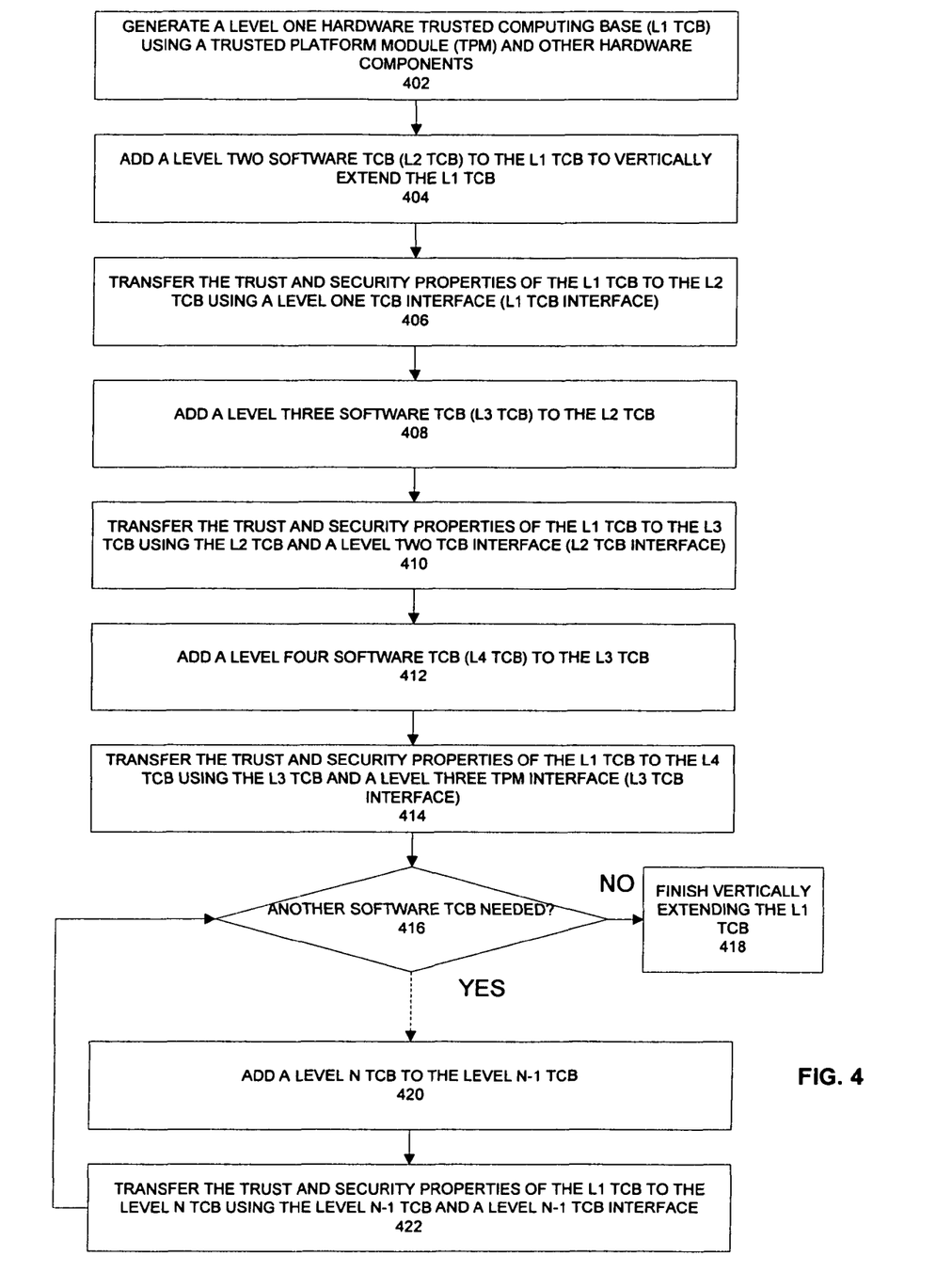
FIG. 4 is a flow diagram illustrating an embodiment of a process for vertically extending a Trusted Computing Base.

FIG. 4 is a flow diagram illustrating an embodiment of a process for vertically extending a Trusted Computing Base. First, according to one embodiment, a Trusted Computing Base (TCB) for a computer system or device (system) may be generated using a trusted hardware device or platform, such as a Trusted Platform Module (TPM), in combination with other hardware components (e.g., hardware-based measurement of booted software and Direct Memory Access (DMA) protection from input/output (I/O) devices) at processing block 402. The TCB may be referred to as the Level one hardware TCB (L1 TCB). At processing block 404, to vertically extend the L1 TCB, a software TCB layer may be added to or built on top of the L1 TCB. The software TCB layer may be referred to as the Level two software TCB (L2 TCB), and may include a trusted kernel. According to one embodiment, the trust and security properties of the L1 TCB may be transferred (e.g., using an induction process) to the L2 TCB and via a Level one TCB interface (L1 TCB interface) at processing block 406.

According to one embodiment, a Level three software TCB (L3 TCB) may be added to or built on top of the L2 TCB providing another layer of software TCB at processing block 408. The L3 TCB may include trusted services, such as network services, file system services, and provisioning services. At processing block 410, the trust and security properties of the L1 TCB may be transferred to the L3 TCB using the L2 TCB and via a Level two TCB interface (L2 TCB interface). According to one embodiment, a Level four software TCB (L4 TCB) may be added to or built on top of the L3 TCB to provide another layer of software TCB and further vertically extending the L1 TCB at processing block 412. The L4 TCB may include trusted applications, such as login, biometric pattern matching, and signal processing. At processing block 414, the trust and security properties of the L1 TCB may be transferred to the L4 TCB using the L3 TCB and via a Level three TCB interface (L3 TCB interface).

According to one embodiment, at decision block 416, determination with regard to whether another software TCB layer is needed may be made. A system may or may not need another software TCB depending on various security and administrative factors, such as organizational goals, predetermined security criteria, and system vulnerability. If no more software TCB layers are needed, the process of vertically extending the TCB may end at processing block 418. However, if more software layers of TCB are necessitated, one or more layers of software TCB up to the $N^{th}$ level (Level N TCB) may be added to, for example, the Level N−1 TCB at processing block 420. According to one embodiment, the trust and security properties of the L1 TCB may be transferred to the Level N TCB using the Level N−1 TCB and via the Level N−1 TCB interface.

Figure 5:
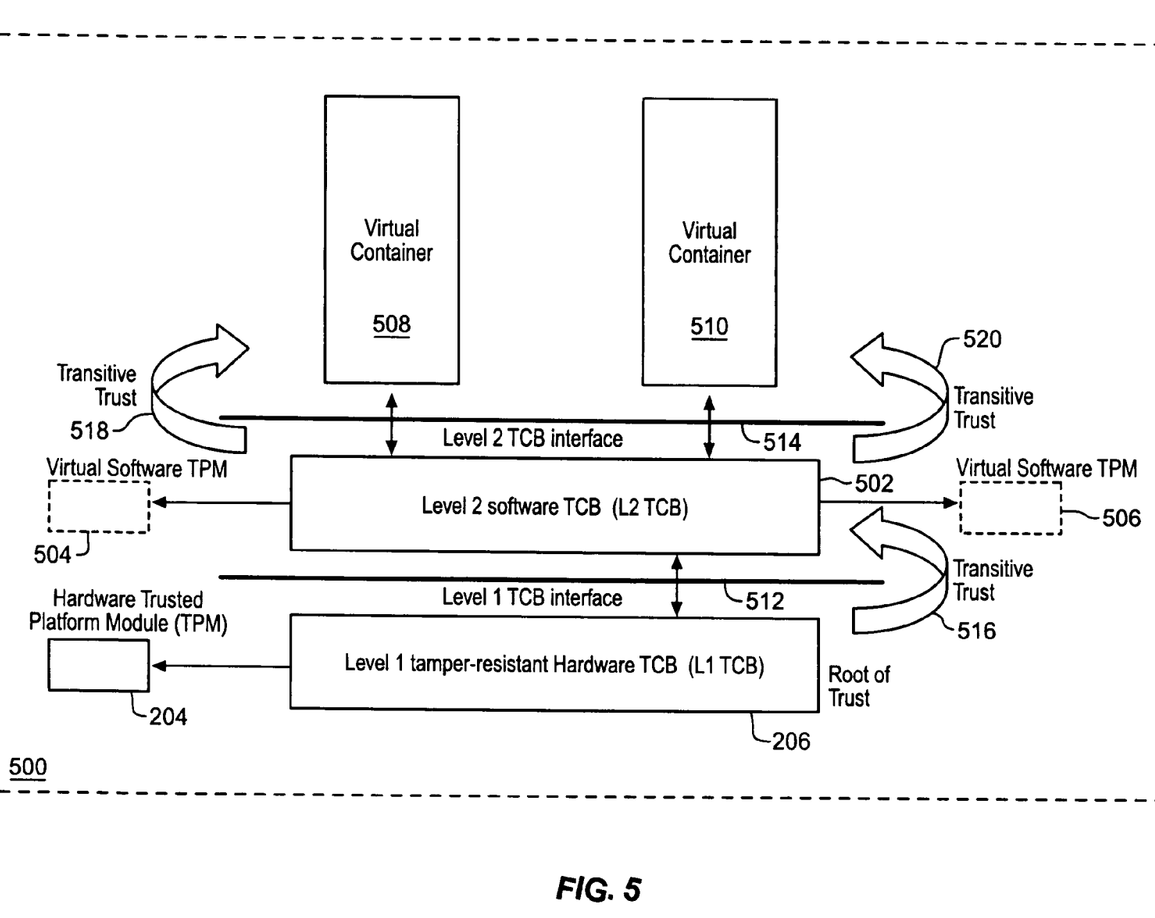
FIG. 5 is a block diagram illustrating an embodiment of a horizontally extended Trusted Computing Base.

FIG. 5 is a block diagram illustrating an embodiment of a horizontally extended Trusted Computing Base. According to one embodiment, as described with referenced to FIGS. 2 and 3, a Trusted Platform Module (TPM) 204 and other trustworthy hardware components (e.g., hardware-based measurement of booted software Direct Memory Access (DMA) protection from input/output (I/O) devices) may be used to form a trustworthy hardware computing base, such as Level one tamper-resistant hardware Trusted Computing Base (L1 TCB) 206. According to one embodiment, the L1 TCB 206 may be extended horizontally into a horizontally extended TCB 500.

According to one embodiment, as described with reference to FIG. 3, a software layer, such as Level two software TCB (L2 TCB) 502, may be added to or built upon the L1 TCB 206. According to one embodiment, the TCB 500 may include one or more virtual containers, such as virtual containers 508-510, populated with a variety of information depending on the functionality of the L2 TCB 502. For example, if the L2 TCB 502 includes a trusted kernel, each of the two virtual containers 508-510 may contain an application. If, for example, the L2 TCB 502 includes a virtual machine monitor (VMM), each of the virtual containers 508-510 may contain a virtual machine (VM). According to one embodiment, each of the virtual containers 508-510 may contain one or more of the following: trusted kernel, trusted services (e.g., network services, file system services, and provisioning services), and trusted applications (e.g., login, biometric pattern matching, and signal processing).

According to one embodiment, the L2 TCB 502 including, for example, a VMM may, in turn, host several virtual containers 508-510 containing VMs, and the L2 TCB 502 may implement a number of virtual software TPMs (virtual TPMs), such as the virtual TPMs 504-506, in software, and assign each of the virtual TPMs 504-506 to its corresponding virtual container 508-510 for its exclusive use. Each of the virtual TPMs 504-506 may implement virtual secure storage in software via encryption. According to one embodiment, the encryption key of each of the virtual TPMs 504-506 may itself be encrypted and stored within the hardware-based L1 TCB 206, keeping the L1 TCB 206 as the root of trust for the horizontally extended TCB 500. For example, having built the L2 TCB 502 using the trust and security properties of the L1 TCB 206, the virtual TPMs 504-506, implemented using the L2 TCB 502, may also have the trust and security properties similar to that of the L1 TCB 206.

As discussed with referenced to FIG. 3, according to one embodiment, the trust and security properties of the hardware-based L1 TCB 206 may be transferred to the virtual containers 508-510 using, for example, virtual TCB interfaces, such as Level one TCB interface (L1 TCB interface) 512 and the Level two TCB interface (L2 TCB interface) 514. According to one embodiment, the L1 TCB interface 512 and the L2 TCB interface 514 may be exposed by the L1 TCB 206 and the L2 TCB 502, respectively. The transferring of the trust and security properties of the L1 TCB 206 to the L2 TCB 502 and the virtual containers 508-510 is illustrated by a number of arrows labeled as transitive trust 516-520.

According to one embodiment, the software-based L2 TCB 502 may not merely virtualize the functionality of the hardware-based L1 TCB 206, but also perform the virtualization such that the trust and security properties of the hardware-based L1 TCB 206 may be mimicked or imitated in software of the L2 TCB 502. According to one embodiment, the mimicking of the trust and security properties of the L1 TCB 206 may be necessary for a software TCB layer, such as the L2 TCB 502, to represent its own trustworthiness to a third party, such as a remote entity or system, with a need to know. According to one embodiment, the virtual TPMs 504-506, having the trust and security properties of the hardware TPM 204 of the L1 TCB 206, may facilitate a secured and measured launch of software in the virtual containers 508-510 to that the launched software within the virtual containers 508-510 may fail to recognize that the virtual containers 508-510 are not running directly in contact with the L1 TCB 206.

According to one embodiment, by having the L2 TCB 502 with the trust and security properties of L1 TCB 206, the implementation of virtual TPMs 504-506 in software and assignation of each of the virtual TPMs 504-506 to a particular virtual container 508-510 may help the L1 TCB 206 support multiple parallel trustworthy software stacks in each of the virtual containers 508-510 from different vendors.

Furthermore, according to one embodiment, virtual containers 508-510 may be deleted or migrated and their corresponding virtual TPMs 504-506 may also be deleted or migrated, as necessitated. For example, a virtual container (e.g., virtual container 508) may hold a UNIX process that has its own corresponding virtual TPM (e.g., virtual TPM 504). When this UNIX process is migrated to a different machine or system, the TPM data in the corresponding virtual TPM 504 may also be migrated to the different machine along with it. Multiple additional virtual containers and virtual TPMs may be added to further expand the horizontally extended TCB 500 up to the $N^{th}$ virtual container and the $N^{th}$ TPM. If no more virtual containers or virtual TPMs are to be added, the process of horizontally extending the L1 TCB 206 may be terminated.

Figure 6:
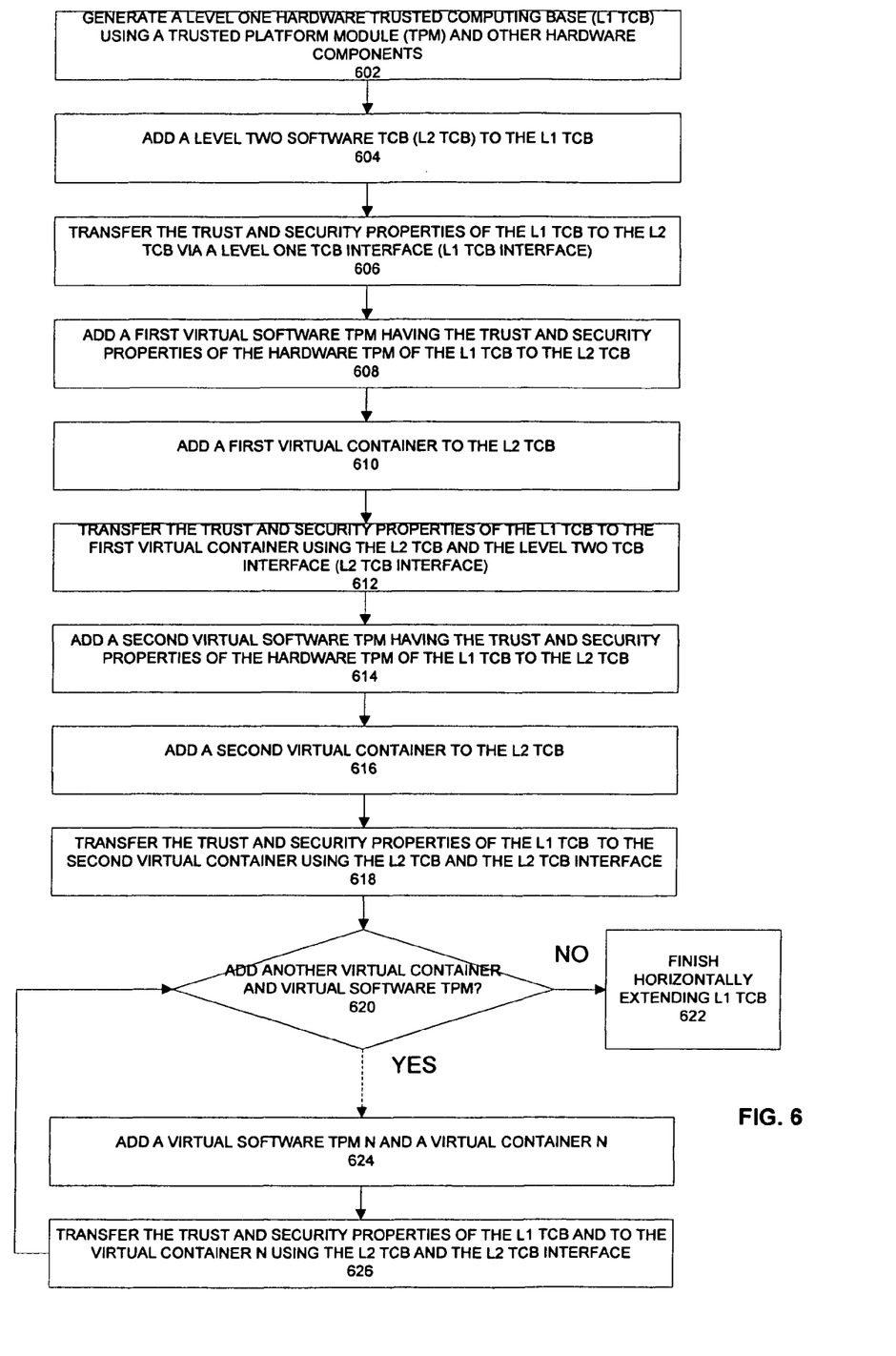
FIG. 6 is a flow diagram illustrating an embodiment of a process for horizontally extending a Trusted Computing Base.

FIG. 6 is a flow diagram illustrating an embodiment of a process for horizontally extending a Trusted Computing Base. First, according to one embodiment, a Trusted Computing Base (TCB) for a computer system or device (system) may be generated using a trusted hardware device or platform, such as a Trusted Platform Module (TPM), and other hardware components (e.g., hardware-based measurement of booted software and Direct Memory Access (DMA) protection from input/output (I/O) devices) at processing block 602. The TCB may be referred to as the Level one hardware TCB (L1 TCB). At processing block 404, to extend the L1 TCB, a software TCB may be added to or built on top of the L1 TCB. The software TCB may be referred to as the Level two software TCB (L2 TCB) and may include, for example, a trusted kernel. According to one embodiment, the trust and security properties of the L1 TCB may be transferred or transitioned to the L2 TCB using, for example, a Level one TCB interface (L1 TCB interface) at processing block 606.

According to one embodiment, to horizontally extend the L1 TCB, a virtual software TPM (virtual TPM) having the trust and security properties of the hardware-based TPM of the L1 TCB may be added to the L2 TCB at processing block 608. At processing block 610, the first virtual TPM in the L2 TCB may be assigned to the first virtual container. The trust and security properties of the hardware L1 TCB may be transferred to the first virtual container using the L2 TCB and a Level two TCB interface (L2 TCB interface) at processing block 612.

According to one embodiment, to further horizontally extend the L1 TCB, a second virtual TPM having the trust and security of properties of the hardware-based TPM of the L1 TCB may be added to the L2 TCB at processing block 614. At processing block 616, a second virtual container corresponding to the second virtual TPM may be assigned to the L2 TCB. The trust and security properties of the hardware L1 TCB may be transferred (e.g., via the induction process) to the second virtual container using the L2 TCB and via the L2 TCB interface at processing block 618.

According to one embodiment, at decision block 620, determination of whether additional virtual TPMs and/or corresponding virtual containers are needed may be made. A system may or may not need another virtual TPM and/or virtual container depending on various security and administrative factors, such as organizational goals, predetermined security criteria, and system vulnerability. If no more virtual TPMs or virtual containers are needed, the process of horizontally extending the TCB may end at processing block 622. However, if more virtual TPMs and/or virtual containers are necessitated, one or more virtual TPMs (e.g., virtual TPM N) and the corresponding virtual containers (e.g., virtual container N) may be added at processing block 624. According to one embodiment, the trust and security properties of the L1 TCB may be transferred to the virtual TPM N using the L2 TCB and to the virtual container N using the L2 TCB and via the L2 TCB interface.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A system comprising:
   an integrated circuit coupled with a storage medium via a bus, the integrated circuit to generate a first level trusted computing base (TCB) having a plurality of hardware components including a trusted platform module (TPM);
   form an extended TCB by adding a second level TCB to the first level TCB, wherein the second level TCB is software-based;
   transfer properties associated with the first level TCB to the second level TCB;
   add one or more levels of software-based TCB to the extended TCB;
   transfer the properties associated with the first level TCB to the one or more levels of software-based TCB via one or more levels of TCB interfaces;
   store measured values depending on a level of abstraction of the one or more levels of software TCB; and
   use the one or more levels of software TCB independent of hardware-based or software-based implementation of a level of software TCB below the one or more levels of software TCB.

2. The system of claim 1, wherein the transferring of the properties is performed using a first level TCB interface having at least one of the following operations: secure storage, initiation of software integrity measurement, and attestation.

3. The system of claim 1, wherein the properties associated with the first level TCB comprise trust and security properties including at least one of the following: tamper-resistant secure storage, tamper-resistant software measurement, tamper-resistant attestation of previously measured values via tamper-resistant signature algorithms, and private keys.

4. The system of claim 1, wherein a level of software-based TCB of the one or more levels of software-based TCB of a first system intact with a counterpart level of software TCB of a second system independent of other levels of the one or more levels of software-based TCB of the first system.

5. The system of claim 1, wherein the second level TCB is executed independent of the first level TCB using a processor and main memory of a system.

6. The system of claim 1, wherein the second level TCB and the one or more levels of software-based TCB use encryption keys for attestation and secure storage, the encryption keys are encrypted using protected encryption keys in a TCB level below the second level TCB and the one or more levels of software-based TCB, certified via a signature of the private attestation key of the TCB level below the second level TCB and the one or more levels of software-based TCB, and stored in the TCB level below the second level TCB and the one or more levels of software-based TCB and terminating at the first level TCB being a root of trust for the extended TCB.

7. A system comprising:
an integrated circuit coupled with a storage medium via a bus, the integrated circuit to generate a first level trusted computing base (TCB) having a plurality of hardware components including a trusted platform module (TPM);
form an extended TCB by adding a second level TCB to the first level TCB, wherein the second level TCB is software-based;
add a first virtual software TPM to the second level TCB; and
transfer properties associated with a hardware TPM of the first level TCB to the first virtual software TPM.

8. The system of claim 7, wherein the integrated circuit is further configured to generate a first virtual container corresponding to the first virtual software TPM, the first virtual container comprises trusted services including at least one of the following: network services, file system services, and provisioning services.

9. The system of claim 7, wherein the integrated circuit is further configured to add one or more virtual software TPMs to the extended TCB, the one or more virtual software TPMs having the properties associated with the hardware TPM of the first level TCB; and generate one or more virtual containers corresponding to the one or more virtual software TPMs, the one or more virtual containers comprise trusted applications including at least one of the following: login, biometric pattern matching, and protected signal processing.

10. The system of claim 8, wherein the first virtual software TPM comprises security assurance properties assigned to the first virtual containers to separate the first virtual containers from control of the hardware TPM.

11. The system of claim 8, wherein the first virtual software TPM comprises tamper-resistance properties derived from address space isolation features and integrity measurement capabilities exposed by the first level TCB.

12. The system of claim 7, wherein the integrated circuit is further configured to transfer the properties associated with the hardware TPM of the first level TCB to the one or more virtual software TPMs, wherein the properties including the security assurance properties and the tamper-resistance properties.

13. The system of claim 7, wherein the first level TCB comprises a root of trust for the extended TCB including the first level TCB, the second level TCB, the first virtual software TPM, the one or more virtual software TPMs, the first virtual container, and the one or more virtual containers.

14. The system of claim 13, wherein the integrated circuit is further configured to: delete data associated with the first virtual software TPM and the one or more virtual software TPMs of a first system to a counterpart virtual software TPM of a second system; and seamlessly migrate the data associated with the first virtual software TPM and the one or more virtual software TPMs of a first system to a counterpart virtual software TPM of a second system.

* * * * *